United States Patent
Cipala et al.

(10) Patent No.: US 12,241,462 B2
(45) Date of Patent: Mar. 4, 2025

(54) BYPASS AND DEMAND PUMP AND VALVE SYSTEM FOR BYPASS AND DEMAND PUMP

(71) Applicant: Delavan AG Pumps, Inc., Minneapolis, MN (US)

(72) Inventors: Logan Cipala, Ellsworth, WI (US); Matt Johnson, Champlin, MN (US); David Beaudry, Minneapolis, MN (US)

(73) Assignee: Delavan AG Pumps, Inc., Minneapolis, MN (US)

( * ) Notice: Subject to any disclaimer, the term of this patent is extended or adjusted under 35 U.S.C. 154(b) by 0 days.

(21) Appl. No.: 18/759,318

(22) Filed: Jun. 28, 2024

(65) Prior Publication Data
US 2025/0003401 A1    Jan. 2, 2025

Related U.S. Application Data

(63) Continuation of application No. 18/344,596, filed on Jun. 29, 2023, now abandoned, which is a continuation of application No. 16/460,729, filed on Jul. 2, 2019, now abandoned.

(60) Provisional application No. 62/693,781, filed on Jul. 3, 2018.

(51) Int. Cl.
| | |
|---|---|
| F04B 43/02 | (2006.01) |
| F04B 43/00 | (2006.01) |
| F04B 43/12 | (2006.01) |
| F04B 49/24 | (2006.01) |
| F04B 53/16 | (2006.01) |
| F16K 1/30 | (2006.01) |
| F16K 27/00 | (2006.01) |

(52) U.S. Cl.
CPC .............. *F04B 43/02* (2013.01); *F04B 49/24* (2013.01); *F04B 53/16* (2013.01); *F16K 1/301* (2013.01); *F16K 27/003* (2013.01); *F04B 43/0045* (2013.01); *F04B 43/1207* (2013.01)

(58) Field of Classification Search
CPC .......... F04B 43/02; F04B 53/16; F04B 49/24; F04B 49/22; F04B 43/1207; F04B 43/0045; F16K 27/003; F16K 1/301
See application file for complete search history.

(56) References Cited

U.S. PATENT DOCUMENTS

| | | | | |
|---|---|---|---|---|
| 3,775,030 A | * | 11/1973 | Wanner | F04B 43/0045 417/388 |
| 3,884,598 A | | 5/1975 | Wanner | |
| 4,153,391 A | * | 5/1979 | Hartley | F04B 43/026 417/269 |
| 5,450,987 A | * | 9/1995 | Nolte | F04B 43/026 222/333 |

(Continued)

*Primary Examiner* — David N Brandt
(74) *Attorney, Agent, or Firm* — Merchant & Gould P.C.

(57) ABSTRACT

A diaphragm pump such as a three-chamber diaphragm pump includes a head having an inlet port and an outlet port and defining an inlet side including inlet chambers; and an outlet side having a center outlet chamber. Each of the inlet chambers includes an associated inlet valve. A single shutoff valve controlling fluid flow to the center outlet chamber and a single bypass valve in fluid communication between the center outlet chamber and the inlet side. The single shutoff valve has a plunger with an oval cross-section extending into the center outlet chamber. The single shutoff valve and the single bypass valve have adjustable pressure set points that are adjustable independently of one another.

11 Claims, 11 Drawing Sheets

(56) References Cited

U.S. PATENT DOCUMENTS

| | | | |
|---|---|---|---|
| 5,476,367 A * | 12/1995 | Zimmermann | F04B 49/24 |
| | | | 417/415 |
| 5,707,219 A | 1/1998 | Powers | |
| 6,019,124 A | 2/2000 | Sebion et al. | |
| 6,048,183 A * | 4/2000 | Meza | F04B 53/1065 |
| | | | 417/569 |
| 6,899,530 B2 | 5/2005 | Lehrke et al. | |
| 6,941,853 B2 | 9/2005 | Hembree | |
| 7,090,474 B2 | 8/2006 | Lehrke et al. | |
| 7,467,582 B2 | 12/2008 | Hembree | |
| 8,133,045 B2 | 3/2012 | Featherstone | |
| 8,752,629 B2 * | 6/2014 | Moen | G05D 7/0126 |
| | | | 166/324 |
| 10,125,762 B2 | 11/2018 | Pangburn et al. | |
| 2017/0204847 A1* | 7/2017 | Kimberlin | F04B 53/16 |
| 2018/0119833 A1* | 5/2018 | Nakanishi | F04B 45/04 |

* cited by examiner

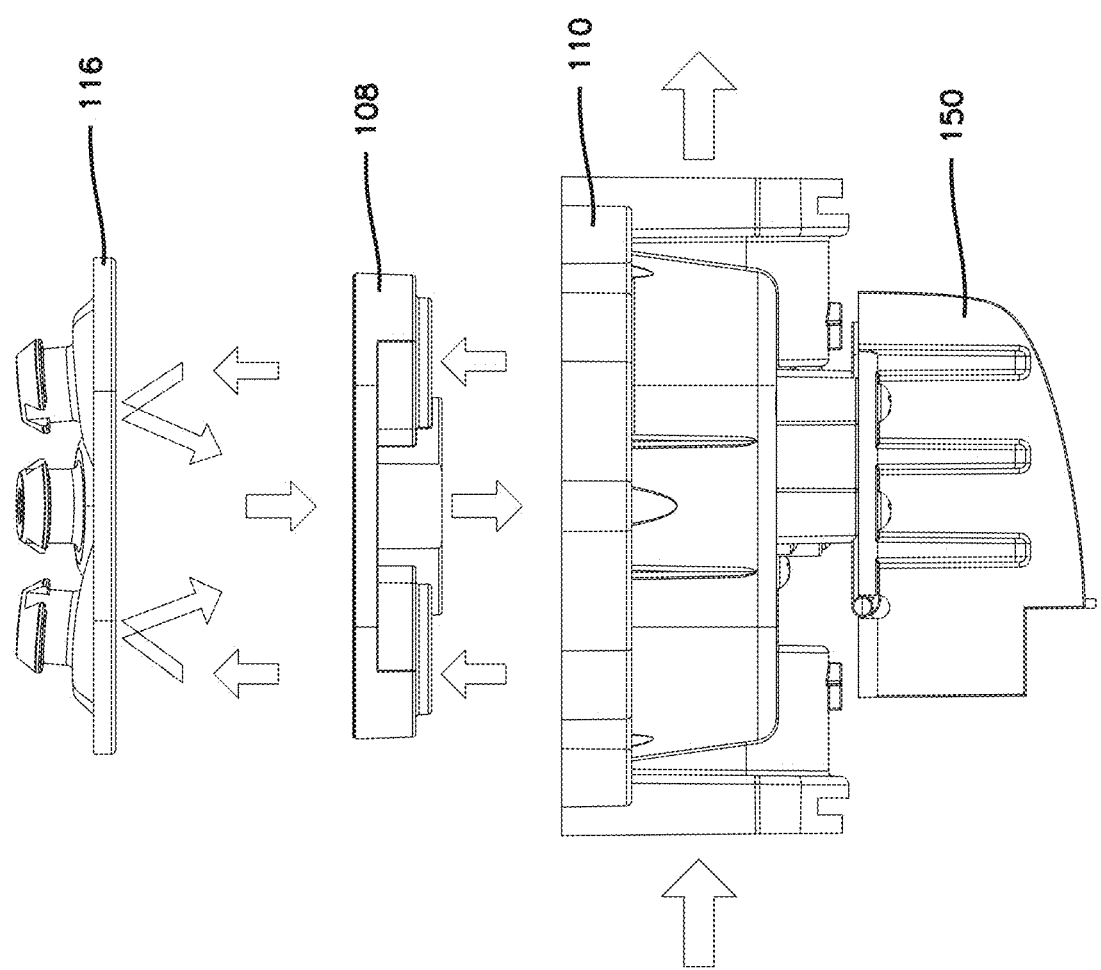

BYPASS AND DEMAND PUMP AND VALVE SYSTEM FOR BYPASS AND DEMAND PUMP

CROSS-REFERENCE TO RELATED APPLICATIONS

This application is a Continuation of U.S. patent application Ser. No. 18/344,596, filed Jun. 29, 2023, which is a Continuation of U.S. patent application Ser. No. 16/460,729, filed Jul. 2, 2019, which claims benefit of Provisional Patent Application No. 62/693,781, filed Jul. 3, 2018.

BACKGROUND OF THE INVENTION

Field of the Invention

The present invention is directed to an improved pump and valve system operable in a bypass mode and a demand mode and to a method of operating such a pump.

Description of the Prior Art

Positive displacement pumps and in particular diaphragm pumps, are used for various types of applications. Depending upon the type of application, the requirements for the pump and controlling flow and pressure may vary widely. Such pumps are often broadly categorized as either a demand pump or a bypass pump.

Demand type pumps are often used where a set flow and pressure are required. Common applications may include a spray wand for agricultural spot spraying. For such a use, when the release valve such as found in a wand is closed, pressure increases to a preset limit and the pressure switch shuts off the motor. However, the pump has valves that trap pressure in the line. Therefore, when the end release valve is open, the wand is turned back on and pressure in the line may decrease until falling below a set point that restarts the pump. Operating in such a demand mode is typically more stressful to the pump. However, this may not be a satisfactory configuration where variable rates are required.

In contrast to demand pumps, bypass pumps are suited for use where a wide range of flows and pressures may be required. An example of a common use as is a spray bar having nozzles that are independently controlled and may have independent flow needs. In a bypass pump, the pump remains on regardless of the pressure in the system. For such systems, flow rate may vary such as when one nozzle is in operation as opposed to two or more nozzles are being utilized. If there are nozzles that are not utilized, the excess flow is not delivered from the pump, but is bypassed within the pump. Such pumps must be configured to accommodate the highest flow requirements for the system. Bypass pumps prevent problems associated with repeated on and off cycling of the pumps, which may burn out the pump motor.

Although it may be possible to utilize both a bypass operating configuration and a demand operating configuration, the added control and flow for each operating mode typically requires additional control and/or flow elements that may enlarge the pump and may make it impractical for many applications. Although pumps have been developed that may be able to function as a demand pump or a bypass pump, the compact configuration of lower flow diaphragm pumps does not provide sufficient space for valves and controls to operate satisfactorily in both demand mode and a bypass mode without increasing the size of the head.

Moreover, demand pumps and bypass pumps of similar capacities require different housings. The same capacity bypass pump and demand pump would typically have a different style housing. The manufacture of such housings, which are typically molded, would be improved if a single mold with removable mold inserts could be utilized in a method for creating a bypass pump housing, a demand pump housing, or a combination bypass and demand pump housing mountable to the same motor.

It can be seen then that a new and improved pump and valve system are needed that can be operated as both a demand pump and as a bypass pump. Moreover, such a pump should be simple and inexpensive to manufacture. Such a pump should be sufficiently compact and have a compact valve system so that it does not occupy additional volume to make the valve system impractical. Moreover, such a pump system should be configured so that the same housing may be utilized with different mold inserts to allow for making interchangeable housings for a demand pump, for a bypass pump, or for a combination demand and bypass pump. The demand and bypass pressure settings should be adjustable independently of one another in the same pump. The present invention addresses these as well as other problems associated with demand and bypass pumps.

SUMMARY OF THE INVENTION

The present invention is directed to a diaphragm pump with a valve system operable in bypass mode and in a demand mode. The pump includes a head and a motor. The head includes a lower housing assembly and an upper housing assembly. A valve plate assembly is mounted intermediate the upper housing assembly and the lower housing assembly. A shutoff switch housing mounts to the upper housing assembly.

A drive shaft extends from the motor, drives the components in the head, and operates the diaphragm and valves. A cam mounts on the drive shaft and within a bearing and drives a wobbler. As the drive shaft rotates the wobbler or wobble plate with a face angled at approximately 3-4.5 degrees "wobbles" to convert axial motion into linear motion of the wobbler. The linear motion of the wobbler stretches and deforms the diaphragm to create a pumping action. The pump may typically include three or more chambers and includes an inlet valve for each chamber. As the wobbler rotates and oscillates back and forth by the cam, the diaphragm is deformed back and forth to pump fluid. The valves fit into the valve plate assembly that spaces the three valves and chambers and is engaged by the diaphragm. The discharge valve mounts on the opposite side of the valve plate assembly. The discharge valve forms a seal that engages an inner portion of the upper housing assembly, as explained hereinafter.

The upper housing assembly includes sliding connectors at the fluid ports. Such connectors allow for snapping in complementary fluid lines to provide a quick disconnect. Alternatively, the ports may have a conventional threaded connector for connection to a complementary threaded connector of a fluid line. The connectors are able to accommodate adapters to mount fluid lines of different diameters to the pump.

The pumped fluid generally flows into an inlet port through the head and exits out an outlet port. The pumped fluid is initially drawn from the inlet port into the pumping chambers through the valve plate assembly by the diaphragm. The pumped fluid then passes through an opening in the center of the valve plate assembly and through the outlet cavity to the outlet port.

The pump of the present invention is configured for operation as either a bypass pump or a demand pump. To accomplish this dual operation, a switch adapter mounts to the upper housing and provides for mounting the shutoff valve switch assembly for the shutoff valve to the upper housing. The switch adapter includes a gasket on one side and a neoprene seal on the opposite face. The upper housing also receives a bypass valve housing in a triangular recess aligned with the bypass valve. The bypass valve includes a flexible disc received in a complementary shutoff valve chamber formed in the upper housing. The bypass valve chamber also spans the interior and exterior of the outlet cavity. The triangular recess on the exterior of the upper housing leads to the bypass valve chamber in the interior of the upper housing assembly. A bypass spring is engaged by guides that seat in the bypass valve housing. An adjustment screw engages the bypass spring and provides for setting a pressure at which fluid bypasses the outlet, as explained hereinafter. Rotation of the adjustment screw in a first direction compresses the bypass spring and rotation of the adjustment screw in an opposite direction allows the bypass spring to extend, thereby providing for adjustment of the force of the spring acting on the disc and to control the backpressure at which the disc deforms and allows fluid to pass.

In addition, the pump functions as a demand pump with a shutoff switch including a housing base, a switch lever arm, a low pressure spring, and a micro-switch, all fitting into the switch housing, mounting onto the upper housing. The shutoff pressure may be adjusted independently by turning shutoff valve low pressure adjustment screw. Both the bypass pressure and the low pressure operating points for the pump can be manually adjusted independently by accessing the bypass adjustment screw and the low-pressure adjustment screw from the exterior of the pump. However, the pressure points are typically set at the factory with customers prescribing a particular bypass pressure setting and a low pressure shutoff setting. It can also be appreciated that the two pressure set points for bypass and shutoff are independently adjustable of one another without removal of the head or any components. With both a shutoff valve and a bypass valve, the pump is always in both a demand and a shutoff mode and has the superior characteristics and advantages of each type of pump.

The three chambers each have an inlet valve and are opened and closed as the wobbler rotates and stretches and deforms the molded diaphragm. An oval shaped outlet cavity is formed by a cavity wall. The outlet cavity at least partially intersects with each of the three chambers. The check valve includes a plunger biased by a plunger spring. An oval O-ring provides a seal against an oval cylinder receiving the plunger. It can be appreciated that the oval shape of the plunger provides for sufficient volume and overlap with each of the three chambers. The present invention therefore avoids having three separate bypass valves for each of the three chambers. The present invention saves further space by having the plunger spring positioned within a void formed in the stem extending from the plunger.

The outlet chamber is also shaped as an oval to mate to the oval outlet cavity and includes both a full circular valve portion as well as a semi-circular valve portion to adapt to the oval configuration. The location and shape of the outlet valve provides for fluid communication with each of the triangular spaced chambers. Moreover, the wobble plate provides for deforming different portions of the diaphragm so that at all times, one of the chambers is substantially closed, one of the chambers is substantially pumping fluid out and one of the chambers is drawing fluid into the chamber. Therefore, constant flow is maintained while the pump is in operation.

In operation, the pump may be shut off with zero flow; in another operating condition, the pump may be in a free flowing operating condition; and in a further operating condition, the pump may be operating, but bypassing fluid. In the first operating condition, there is no flow inside the pump head. The shutoff check valve is in the fully closed position and the bypass valve is in the fully closed position. In such a state, there is insufficient demand or backpressure to open the shutoff valve.

In a second operating condition, the pump is in an open flow condition with no restriction and no backpressure inside the pump head. The shutoff check valve is in a fully opened position. Moreover, the bypass valve remains fully closed. There is no backpressure within the head and all fluid to be pumped passes through the pump.

In a third operating condition, the pump is in a bypass mode. There is restricted flow inside the pump head and there is built up backpressure. The shutoff check valve is in a fully open position. The bypass valve is in an open position due to restriction of flow and the associated backpressure. In such a condition, the flexible stamped disc is deformed to act as a valve member and allow the fluid to bypass back into the pump head. The fluid to be pumped flows through the bypass valve chamber and circulates within the head in the volume exterior of the outlet cavity and on the inlet side of the upper housing. The pump remains in this state until there is sufficient pressure so that the shutoff valve engages. The pump of the present invention therefore avoids the problems related to repetitive cycling on and off and possibly burning out pump motors and wearing other pump elements.

It can be appreciated that the compact geometry of the pump head is critical in achieving a demand and bypass pump that is operable in both modes and has each of the pressure points adjustable independently. Moreover, the present invention is able to achieve such a demand and bypass pump with a single shutoff switch and a single check valve. The oval geometry of the plunger and the complimentary oval cylinder achieve a sufficient valve area to function in a satisfactory manner without requiring enlargement of the surrounding pump components. Moreover, the bypass valve chamber and the bypass valve are also configured for providing operation to the multiple chambers with a single bypass valve.

The unique geometry also achieves production advantages for such a pump. The upper housing assembly provides for receiving both a shutoff switch assembly, a check valve and a bypass valve assembly. However, for many applications, such flexibility of both demand and bypass may not be needed. With the present invention, the molded upper housing assembly may simply include a separate insert to block the shutoff check valve for use while retaining the bypass valve so that the pump is a bypass valve and functions in that mode. However, with a second different insert, the head may be molded with the bypass valve blocked, while the shutoff valve remains so that the pump functions as a demand pump. In a third configuration of molding the upper housing assembly, the mold is configured so that both the oval cylinder and bypass valve chamber are molded into the upper housing assembly. Therefore, the same basic housing assembly with different mold inserts may be molded for use as a demand pump, for use as a bypass pump, or for use as a combination bypass and demand pump. The other shutoff valve components are simply eliminated if the pump is configured as a bypass pump and the other bypass valve components are eliminated if the pump is configured as a demand pump.

These features of novelty and various other advantages that characterize the invention are pointed out with particularity in the claims annexed hereto and forming a part hereof. However, for a better understanding of the invention, its advantages, and the objects obtained by its use, reference should be made to the drawings that form a further part hereof, and to the accompanying descriptive matter, in which there is illustrated and described a preferred embodiment of the invention.

BRIEF DESCRIPTION OF THE DRAWINGS

Referring now to the drawings, wherein like reference numerals and letters indicate corresponding structure throughout the several views:

FIG. 11 is an exploded side view of the head showing fluid flow.

DETAILED DESCRIPTION OF THE PREFERRED EMBODIMENTS

Figure 1:
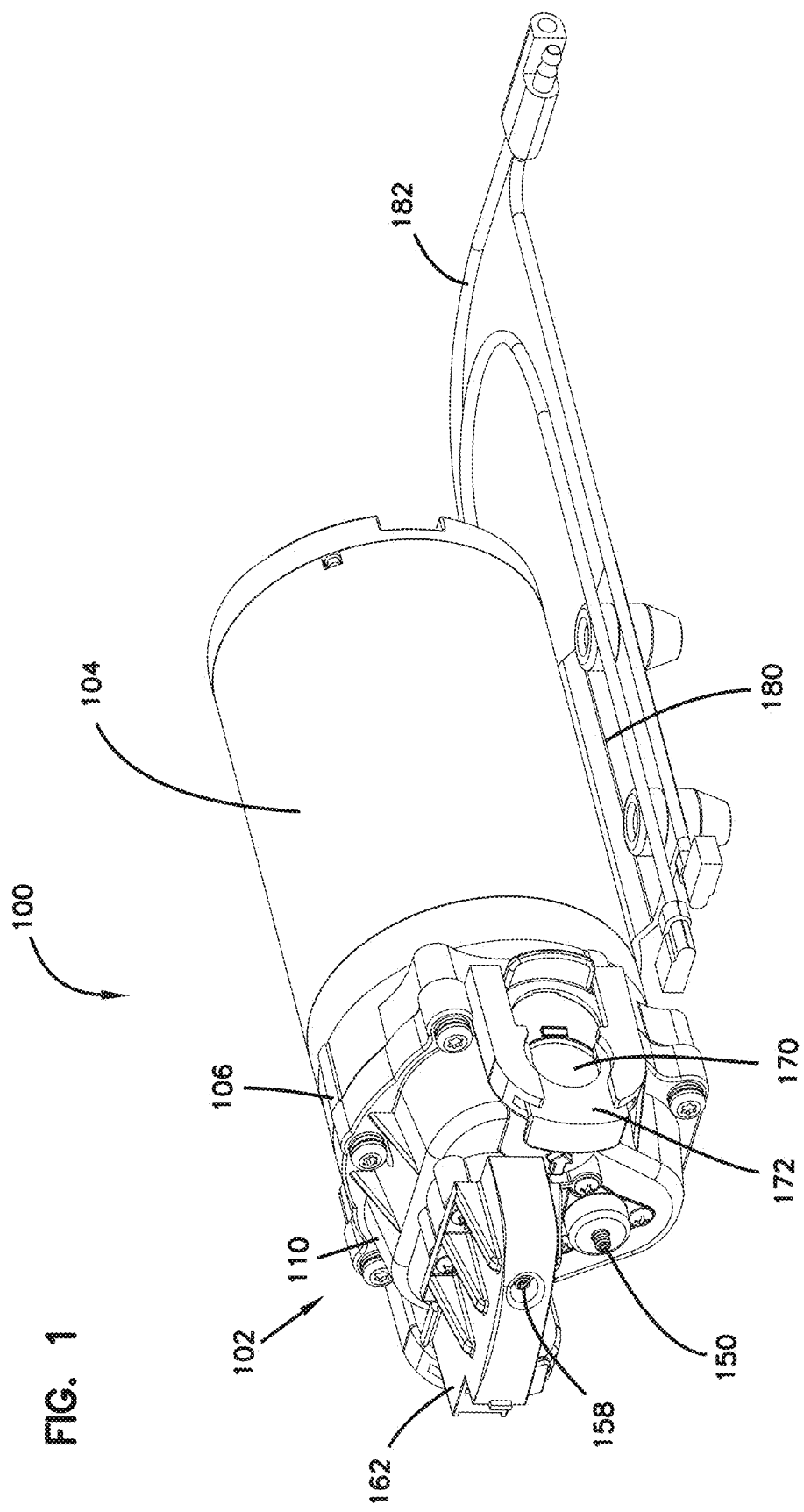
FIG. 1 is a perspective view of a pump according to the principles of the present invention.

Referring now to the drawings and in particular to FIG. 1, there is shown a diaphragm pump, generally designated (100). The pump (100) includes a head (102) and a motor (104). The pump (100) mounts with a bracket (180) to other structure and is powered by a cord (182). The head (102) includes a lower housing assembly (106) and an upper housing assembly (110). A valve plate housing assembly (108) is mounted intermediate the upper housing assembly (110) and the lower housing assembly (106). A shutoff valve housing (150) mounts to the upper housing assembly (110). The housings (106, 108, 110, 150) are connected together and to the motor (104) with hardware (168).

Figure 2:
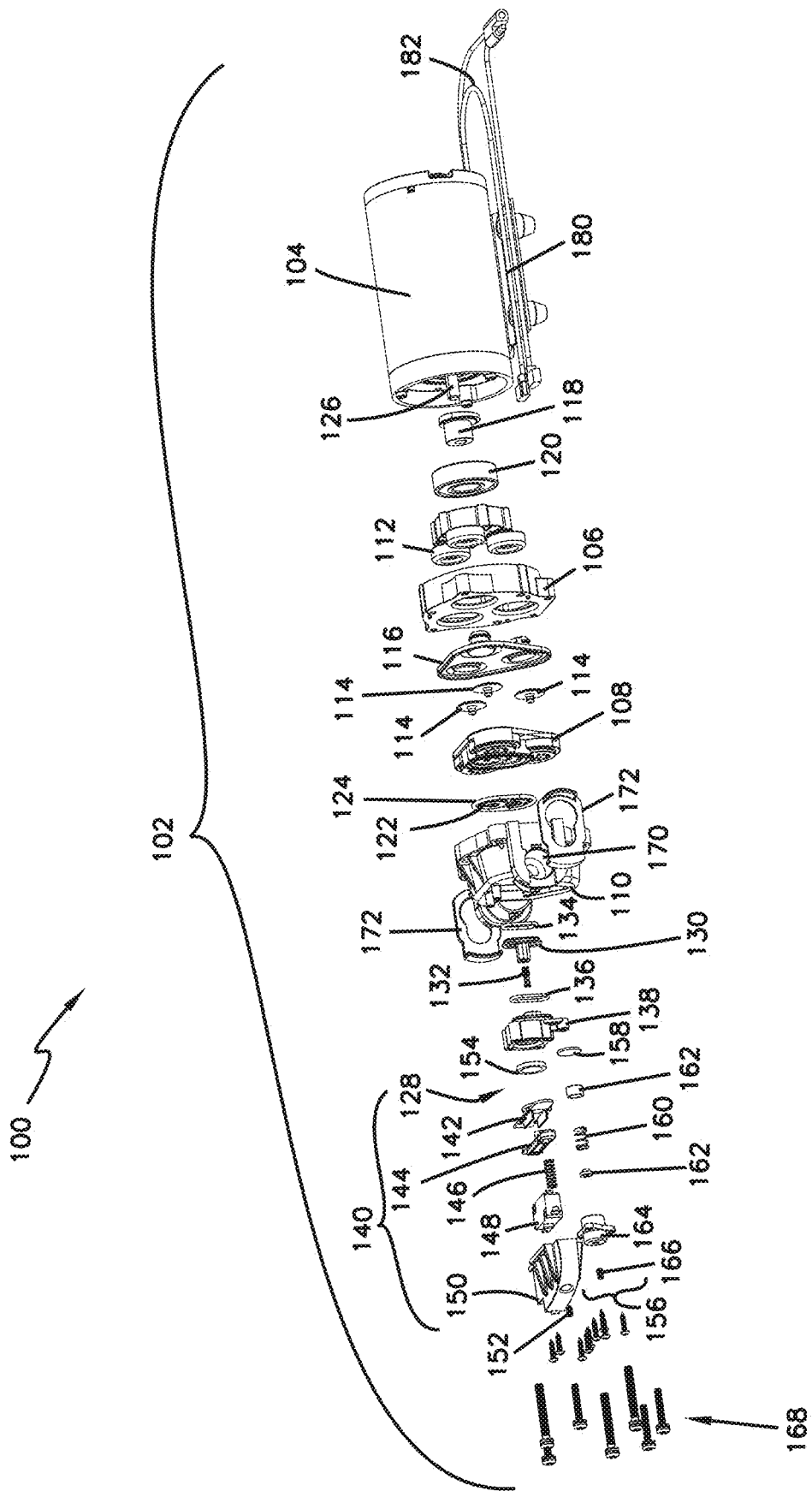
FIG. 2 is an exploded perspective view of the pump in FIG. 1.
Figure 3:
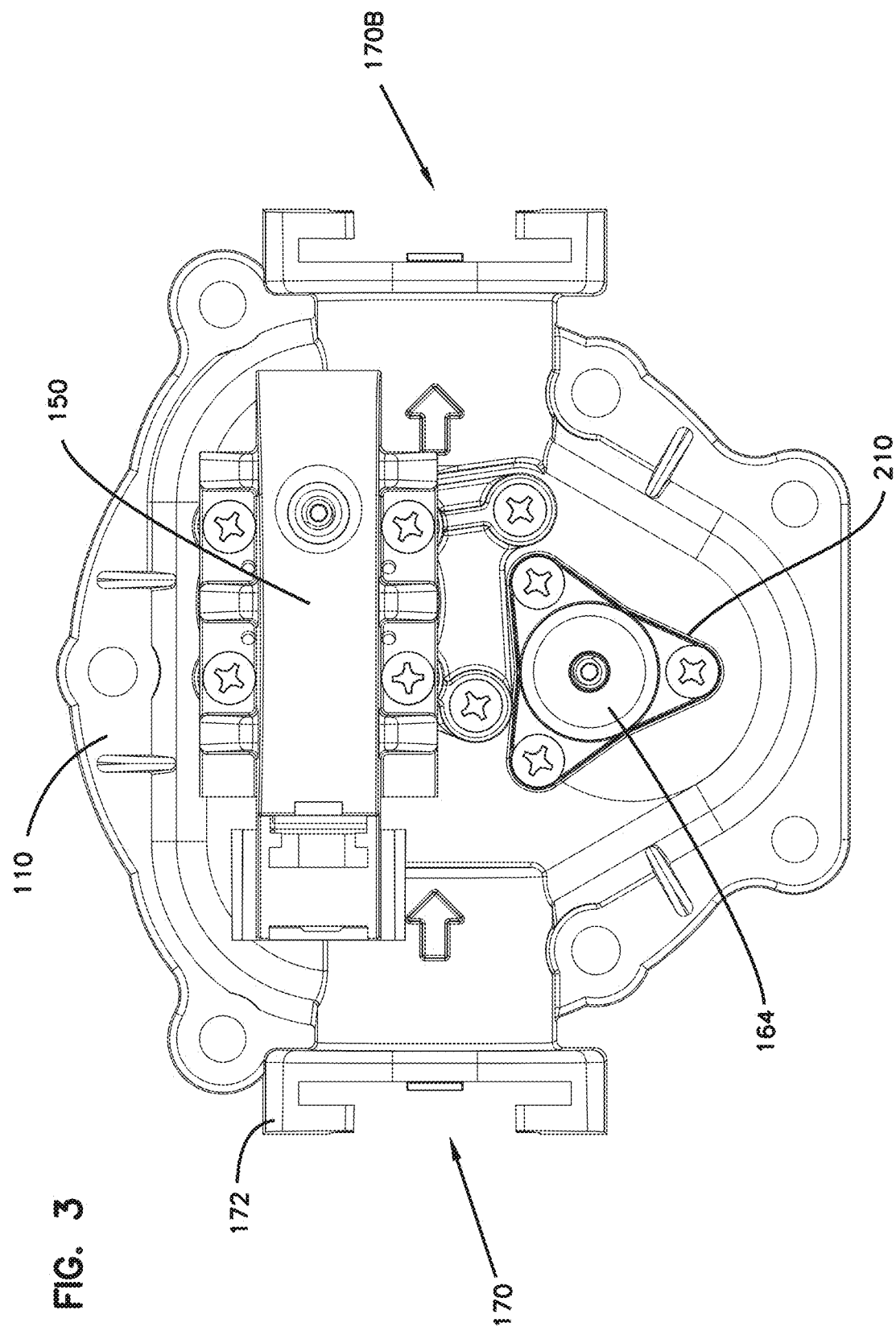
FIG. 3 is a front elevational view of the upper housing assembly for the pump shown in FIG. 1.

Referring now to FIG. 2, extending from the motor (104) is a drive shaft (126) that drives the components in the head (102) and actuates a molded diaphragm (116) and valves (114) and (122). A cam (118) mounts on the drive shaft (126) and within a bearing (120) and drives a wobbler (112). As the drive shaft (126) rotates the wobbler (112) or wobble plate moves with an angled face at an angle of approximately 3-4.5 degrees to convert axial motion into linear motion of the wobbler (112). The linear motion of the wobbler (112) stretches and deforms portions of the molded diaphragm (116). In the embodiment shown, the pump (100) includes three chambers and includes three inlet valves (114). As the wobbler (112) rotates and oscillates back and forth or "wobbles" by the cam (118), the fluid is pumped through the upper housing assembly (110). The inlet valves (114) fit into the valve plate assembly (108) that spaces the three valves and chambers and are engaged by the diaphragm (116). The discharge valve (122) mounts on the opposite side of the valve plate assembly (108). The discharge valve (122) forms a seal (124) that engages an inner portion of the upper housing assembly (110), as explained hereinafter.

The head (102) includes sliding connectors (172) at inlet fluid port (170A) and outlet port (170B). Such connectors (172) allow for a quick connect/disconnect of complementary fluid lines. It can also be appreciated that the ports (170A, 170B) may have conventional threaded connectors for connection to complementary threaded connectors of a fluid line. The sliding connectors (172) are able to accommodate an adapter to mount fluid lines of different diameters to the pump (100).

Referring now to FIG. 11, there is shown the general fluid flow through the pump head (102). The pumped fluid generally flows through an inlet port (170A) through the head (102) and exits through an outlet port (170B). The pumped fluid is initially drawn from the inlet port (170A) into the pumping chambers (200A), (200B) and (200C) through the valve plate assembly (108) by the diaphragm (116). The pumped fluid then passes through an opening in the center of the valve housing plate (108) and through the outlet cavity (202) to the outlet port (170B).

The pump (100) of the present invention is configured for operation as a bypass pump and as a demand pump. As shown in FIGS. 3-6, to accomplish this dual operation, a shutoff check valve (128) is actuated by a shutoff valve switch (140) that attaches to a switch adapter (138) mounted to the upper housing (110) and provides for mounting the shutoff valve switch assembly (140) to the upper housing (110). The switch adapter (138) includes an O-ring (136) on one side and a seal (154) on the opposite face.

Figure 4:
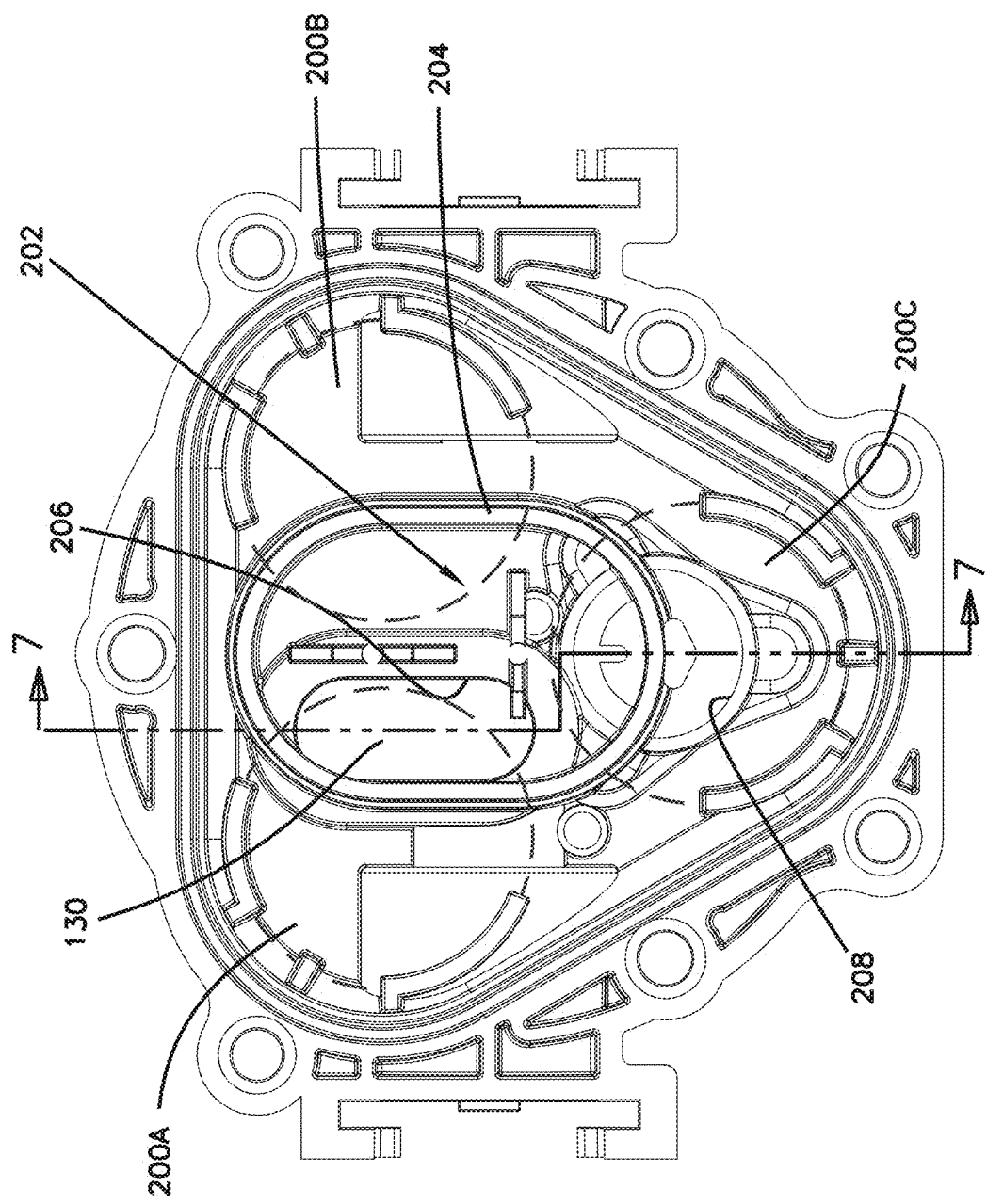
FIG. 4 is a rear elevational view of the upper housing assembly shown in FIG. 3.
Figure 5:
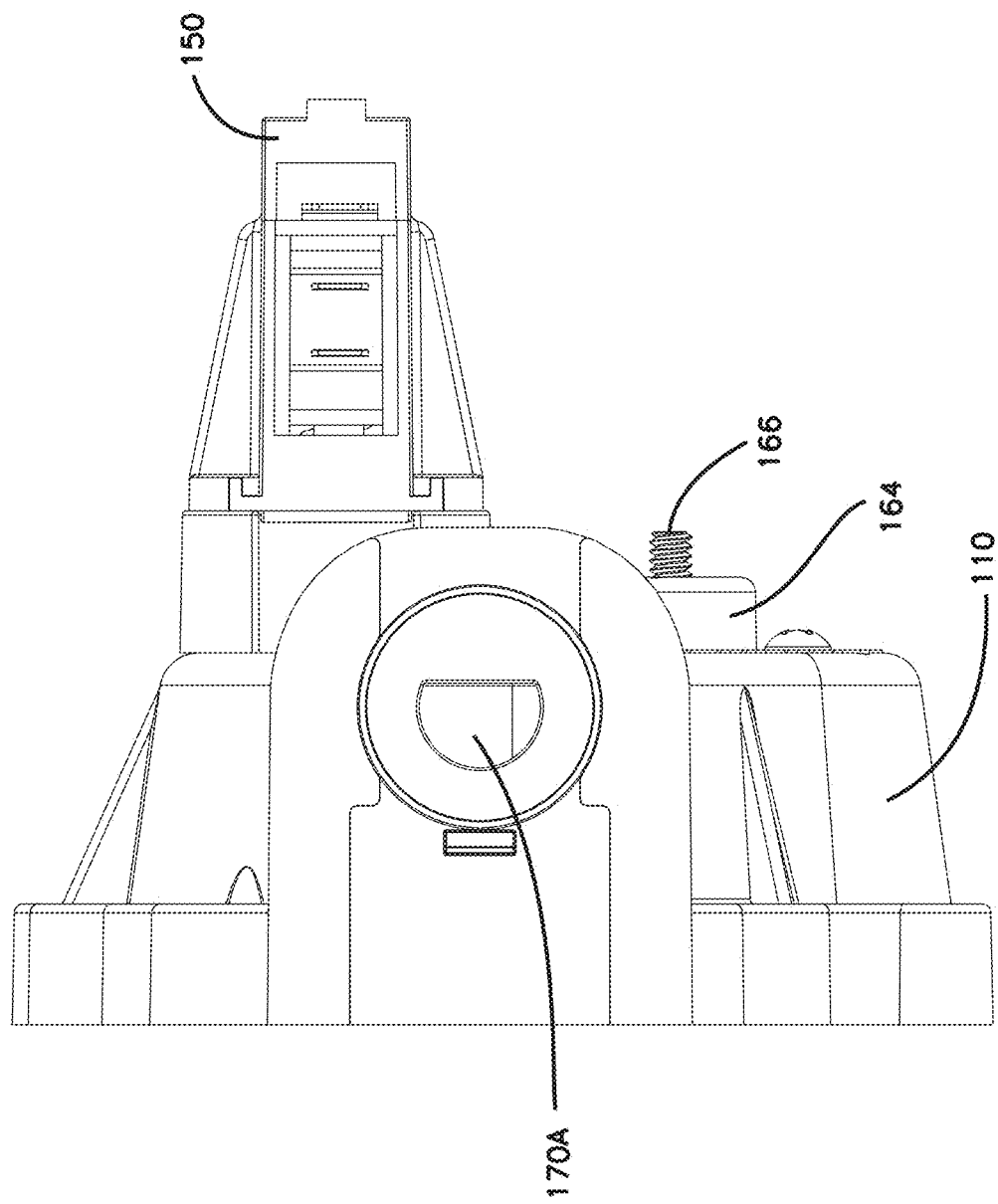
FIG. 5 is a side view of the upper housing assembly shown in FIG. 3.
Figure 6:
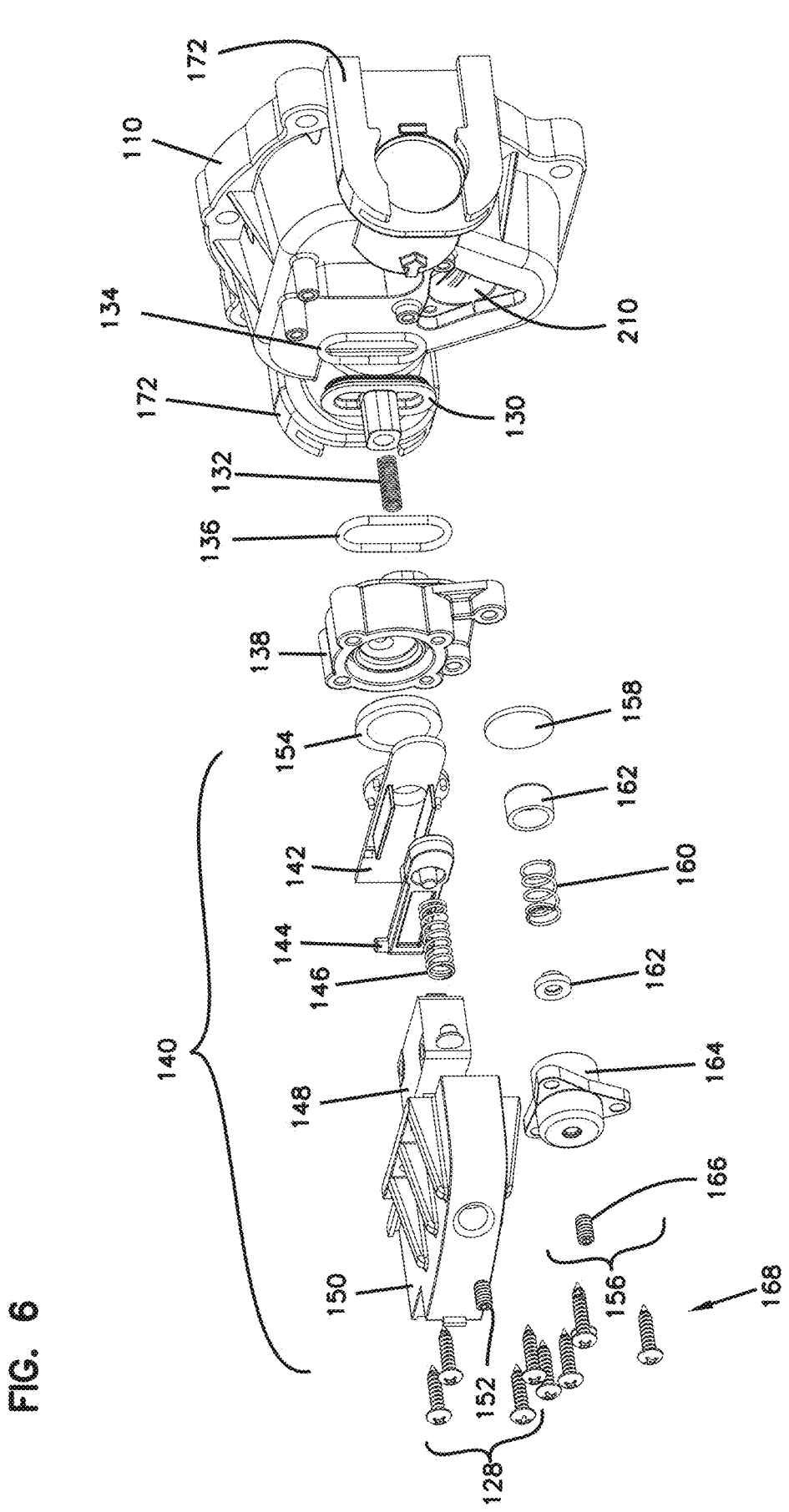
FIG. 6 is an exploded view of the upper housing assembly shown in FIG. 3.

A bypass valve (156) includes a bypass valve housing (164) inserting into a triangular recess (210) in the exterior of the upper housing (110) aligned with a bypass valve chamber (208) on the interior of the upper housing (110). The bypass valve (156) includes a flexible disc (158) received in a complementary bypass valve chamber (208) formed in the upper housing (110). The bypass valve chamber (208) intersects the interior and exterior of the outlet cavity (202), as shown in FIG. 4. The triangular recess (210) on the exterior of the upper housing (110) leads to and fluidly connects to the bypass valve chamber (208) in the interior of the upper housing assembly (110). A bypass spring (160) is engaged by guides (162) that seat into the bypass valve housing (164). Adjustment screw (166) engages the bypass spring (160) and provides for setting a pressure at which fluid bypasses the outlet, as explained hereinafter. Rotation of the adjustment screw (166) in a first direction compresses the bypass spring (160) and rotation of the adjustment screw (166) in an opposite direction allows the bypass spring (160) to extend, thereby providing for adjustment of the force of the spring (160) acting on the disc (158) to control the backpressure at which the disc (158) deforms and allows fluid to pass.

In addition, the pump (100) functions as a demand pump with the check valve (128) controlled by the shutoff switch (140). The shutoff switch assembly (140) includes a housing base (144), a shutoff switch lever arm (142), a low pressure spring (146), and a micro-switch (160), all fitting into the shutoff switch housing (150), mounting onto the upper housing (110). The shutoff pressure may be adjusted independently by turning shutoff valve low pressure adjustment screw (152). Rotation of the adjustment screw (152) in a first direction compresses the low pressure spring (146) and rotation of the adjustment screw (152) in an opposite direction allows the low pressure spring (146) to extend, thereby providing for adjustment of the force of the spring (146) acting on the shutoff switch lever arm (142) and to control the pressure at which the micro-switch (160) activates to open or close the check valve (128) and allow fluid to pass. Therefore, both the bypass pressure and the low pressure operating points for the pump (100) can be manually adjusted independently by accessing the bypass adjustment screw (166) and the low pressure adjustment screw (152) from the exterior of the pump (100). However, the pressure points are typically set at the factory with customers prescribing a particular bypass pressure setting and a low pressure shutoff setting. It is also appreciated that the two pressure set points for bypass and shutoff are independently adjustable of one another without removal of the head or any components. As the pump (100) has both a shutoff valve (128) and a bypass valve (156), the pump (100) is always in both a demand mode and a shutoff mode and has the superior characteristics and advantages of each type of pump.

The three chambers (200A), (200B), (200C) each have an inlet valve (114) and are opened and closed as the wobbler (112) rotates to deform portions of the molded diaphragm (116). An oval outlet cavity (202) is formed by a cavity wall (204). The outlet cavity at least partially intersects with each of the three chambers (200A), (200B), (200C). The bypass valve (156) includes a plunger (130) biased by a plunger spring (132). An oval gasket (134) provides a seal against an oval cylinder (206) receiving the plunger (132). It can be appreciated that the oval shape of the plunger (130) provides for sufficient volume in a small space with the outlet cavity (202) that overlaps with each of the three chambers (200A), (200B) and (200C). The present invention therefore avoids having three separate bypass valves, one for each of the three chambers, as needed with other systems. The present invention saves further space by having the plunger spring (132) within a cylindrical space formed in the rod extending from the back of the plunger (130).

The outlet valve (122) is a molded element shaped as an oval to mate to the oval outlet cavity (202) and includes both a full circular valve portion as well as a semi-circular valve portion to adapt to the oval configuration. The location and shape of the outlet valve (122) and outlet cavity (202) provides for fluid communication with each of the triangular spaced chambers (200A), (200B) and (200C). Moreover, the wobble plate (112) provides for stretching the diaphragm (116) so that at all times, one of the chambers (200A), (200B) or (200C) is substantially closed; one of the chambers is substantially pumping fluid out; and one of the chambers is drawing fluid into the chamber. Therefore, constant flow is maintained while the pump (100) is in operation.

Figure 7:
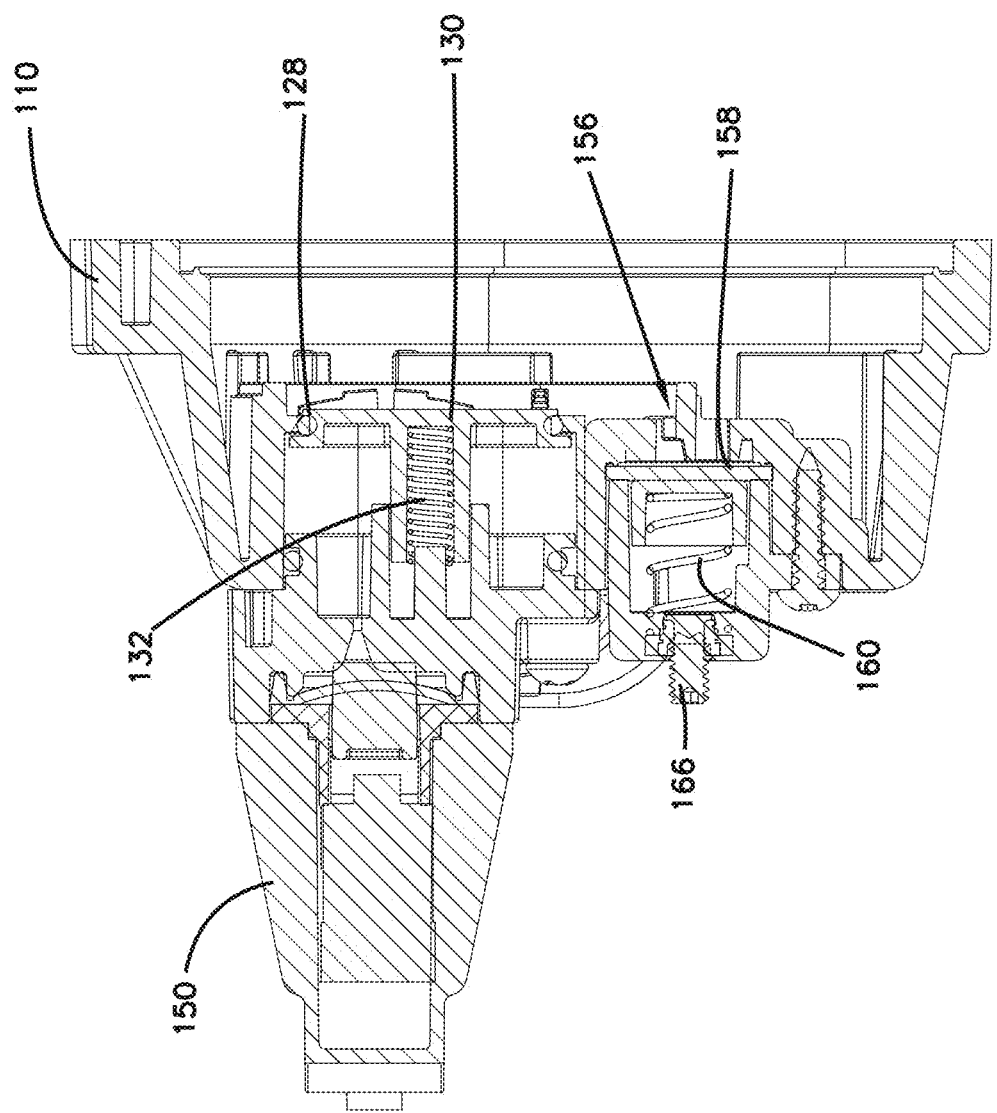
FIG. 7 is a sectional view taken along line 7-7 of FIG. 4 with the pump in a first operating condition with the check valve and the bypass valve both fully closed and no flow inside the head.
Figure 8:
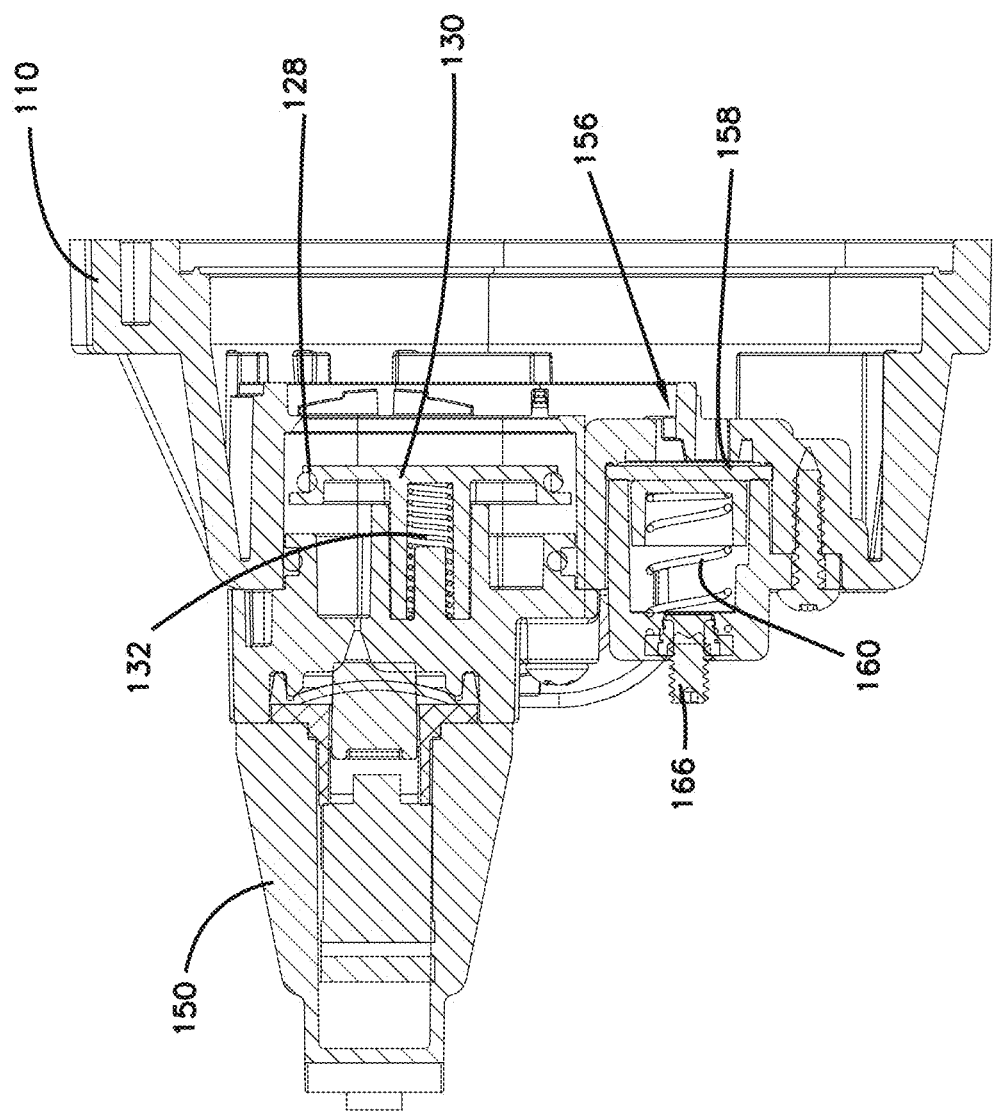
FIG. 8 is a sectional view taken along line 7-7 of FIG. 4 with the pump in a second operating condition with the check valve fully open, the bypass valve fully closed and open flow in the head.
Figure 9:
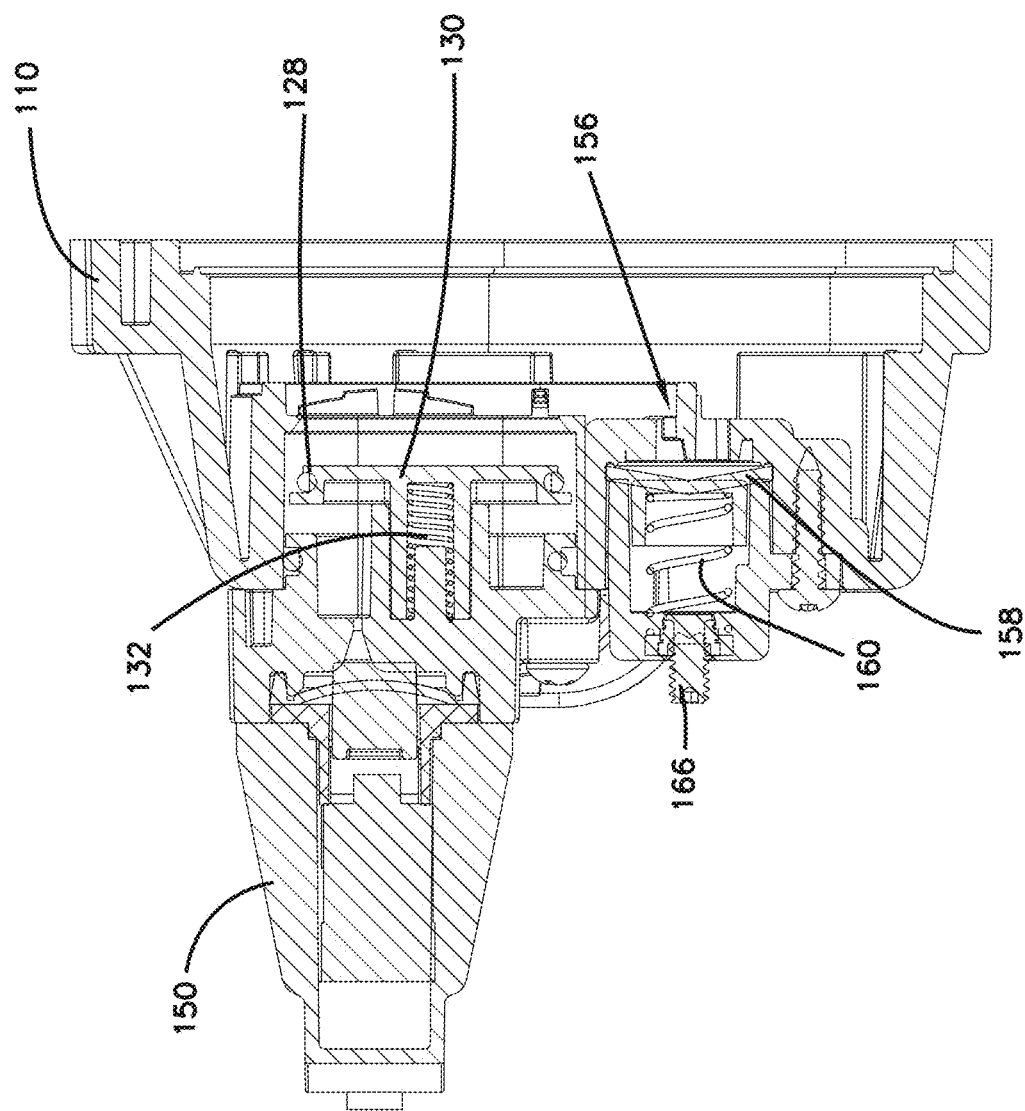
FIG. 9 is a sectional view taken along line 7-7 of FIG. 4 with the pump in a third operating condition with the check valve fully open, the bypass valve open due to back pressure and restricted flow in the head.
Figure 10:
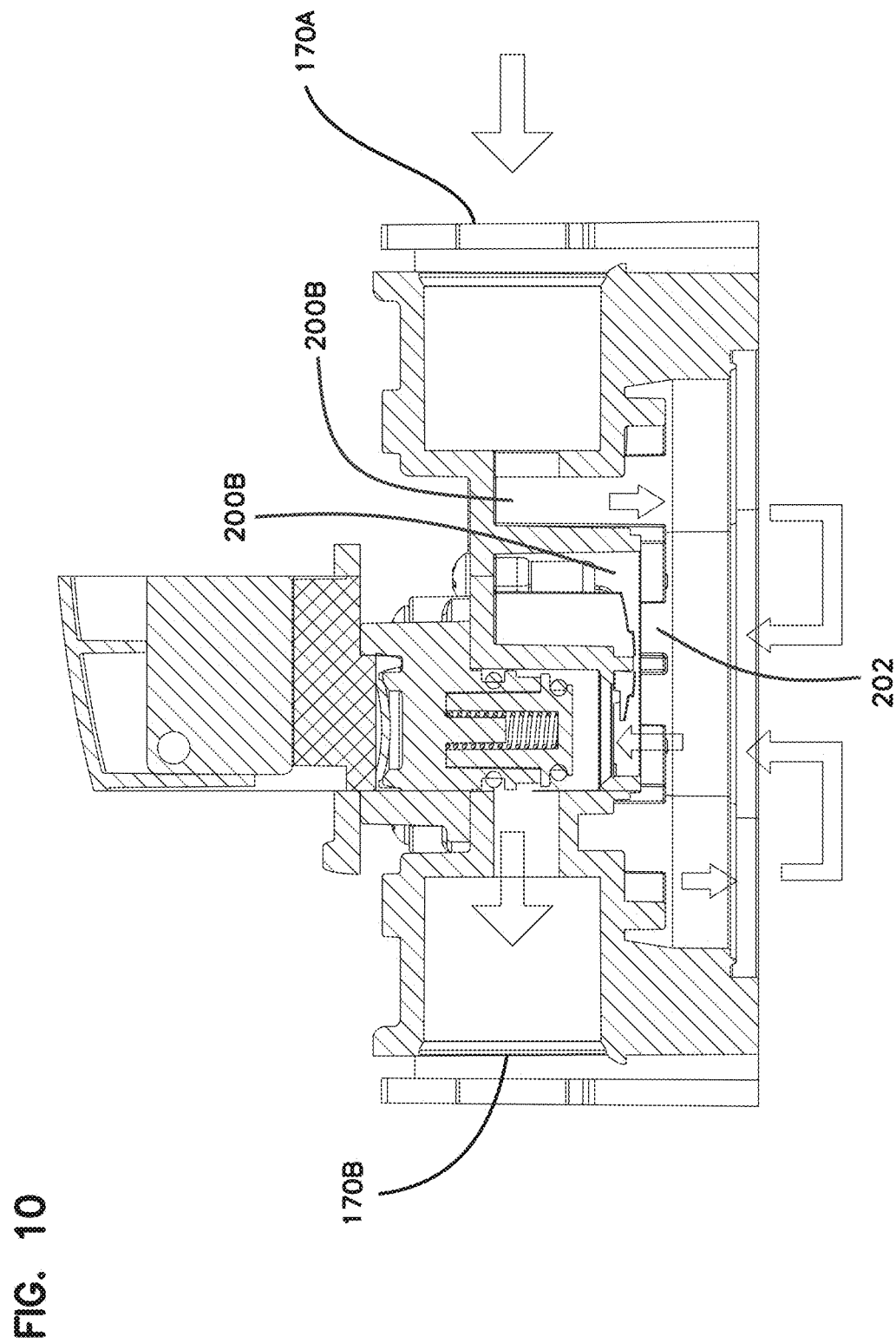
FIG. 10 is a sectional view taken along line 10-10 of FIG. 4 and fluid flow through the upper housing assembly.

In operation, the pump (100) the pump (100) may be shut off with zero flow; in another operating condition, the pump (100) may be in a freely flowing operating condition; and in a further operating condition, the pump (100) may be bypassing fluid. Referring now to FIGS. 7-9, the pump configuration of each of the modes and operating conditions is shown. In FIG. 7, there is no flow inside the pump head (102). The shutoff check valve (128) is in the fully closed position and the bypass valve (156) is in the fully closed position. In such a state, there is insufficient demand or backpressure to open the shutoff valve (128).

Referring now to FIG. 8, the pump (100) is in an open flow operating condition with no restriction and no backpressure inside the pump head (102). The shutoff check valve (128) is in a fully opened position. Moreover, the bypass valve (156) remains fully closed. There is no backpressure within the head (102) and all fluid to be pumped flows through the pump (100).

Referring to FIG. 9, the pump is in a bypass operating condition. There is restricted flow inside the pump head (102) and there is built up backpressure. The shutoff check valve (128) is in an open position. The bypass valve (156) is in an open position due to restriction of flow and the associated backpressure. In such a condition, the flexible stamped disc (158) bows outward. When the disc (158) is deformed in this manner, the disc (158) acts as a valve member and allows the fluid to flow around the periphery of the disc (158) and bypass back into the pump head (102). The fluid to be pumped flows through the bypass valve chamber (208) and circulates within the head (102) in the volume exterior of the outlet cavity (202) and on the inlet side of the upper housing (110). The pump (100) remains in this state until there is sufficient pressure that the shutoff valve (128) engages. The pump (100) of the present invention therefore avoids the problems related to repetitive cycling on and off and burning out pump motors and wearing other pump elements.

It can be appreciated that the geometry of the pump head (102) is critical in achieving a demand and bypass pump that is operable in both demand and bypass modes and has each of the pressure points adjustable independently. Moreover, the present invention is able to achieve such a demand and bypass pump with a single check valve (128) and a single bypass valve (156). The oval geometry of the plunger (130) and the complimentary oval cylinder (206) achieve a sufficient valve area to function in a satisfactory manner without requiring enlargement or rearrangement of the surrounding pump components. Moreover, the bypass valve chamber (208) and the bypass valve (156) are also configured for providing operation to all of the multiple chambers with a same single bypass valve. The oval profile of the plunger (130) and cylinder (206) also achieve adequate engagement and sealing.

The unique geometry also provides for advantages for producing such a pump. It can be appreciated that in the embodiment shown, the upper housing assembly (110) provides for receiving both a shutoff valve assembly (128) and a bypass valve assembly (156). However, for certain applications, such flexibility of both demand and bypass may not be needed. With the present invention, the molded upper housing assembly (110) may simply include a separate insert to block the shutoff check valve for use while retaining the bypass valve so that the pump is a bypass valve and functions in that mode. However, with a second insert, the head (102) may be molded with the bypass valve blocked, while the shutoff valve (128) remains so that the pump functions as a demand pump. In a third configuration of molding the upper housing assembly (110), the mold is configured so that both the oval cylinder (206) and bypass valve chamber (208) are molded into the upper housing assembly (110). Therefore, the same basic housing assembly with different mold inserts may be molded for use as a demand pump, for use as a bypass pump, or for use as a combination bypass and demand pump. The inlet and outlet valves and chambers do not need to be modified. Moreover, the shutoff valve components are simply eliminated if the pump is configured as a bypass pump and the bypass valve components are simply eliminated if the pump is configured as a demand pump.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A diaphragm pump comprising:
a head comprising an inlet port and an outlet port and defining an inlet side including a plurality of inlet chambers; a diaphragm; and an outlet side having a center outlet chamber intermediate the plurality of inlet chambers;
a plurality of inlet valves, wherein each of the plurality of inlet chambers includes an associated inlet valve of the plurality of inlet valves, and the diaphragm is sequentially engaged by each of the inlet valves of the plurality of inlet valves;
a single shutoff check valve controlling fluid flow from the center outlet chamber, the single shutoff check valve comprising a plunger in the center outlet chamber movable between a fully closed position and an open position;
a single bypass valve within the center outlet chamber and in fluid communication with the center outlet chamber and each of the plurality of inlet chambers, the center outlet chamber intersecting each of the plurality of inlet chambers;
a single shutoff switch, the single shutoff check valve being actuated by the single shutoff switch.

2. The diaphragm pump according to claim 1, wherein the plunger comprises a stem, the stem including a recess receiving a spring.

3. The diaphragm pump according to claim 1, wherein the plunger comprises a head with an oval cross section and a stem connected to the head, the stem including a recess receiving a spring.

4. The diaphragm pump according to claim 1, wherein the single shutoff check valve comprises a low pressure spring for changing an adjustable shut off pressure set point of the single shutoff check valve, the shut off pressure set point being adjusted by a low pressure adjustment screw, rotation of the low pressure adjustment screw in a first direction raising the shut off pressure point and rotation in a second direction lowering the shut off pressure set point; and
wherein the single bypass valve comprises a bypass spring for changing an adjustable bypass pressure set point of the single bypass valve, the bypass pressure set point being adjusted by a bypass adjustment screw, rotation of the bypass adjustment screw in a first direction raising a pressure at which fluid bypasses the outlet chamber and rotation in a second direction lowering the bypass pressure set point.

5. The diaphragm pump according to claim 4, wherein each of the pressure set points are independently adjustable.

6. The diaphragm pump according to claim 4, wherein the low pressure adjustment screw and the bypass adjustment screw are independently adjustable by accessing the bypass adjustment screw and the low pressure adjustment screw from an exterior of the pump.

7. The diaphragm pump according to claim 1, wherein the plurality of inlet chambers comprises three inlet chambers.

8. The diaphragm pump according to claim 1, wherein the plurality of inlet chambers comprises three inlet chambers arranged in a triangular configuration in the head with the center outlet chamber intermediate and partially axially overlapping the three inlet chambers.

9. The diaphragm pump according to claim 1, further comprising a wobbler device actuating the inlet valves.

10. The diaphragm pump according to claim 1, the single shutoff switch attaching to a switch adapter.

11. A head for a diaphragm pump; the head comprising:
an inlet port and an outlet port and defining an inlet side including a plurality of inlet chambers; a diaphragm; and an outlet side having a center outlet chamber intermediate the plurality of inlet chambers;
a plurality of inlet valves, wherein each of the plurality of inlet chambers includes an associated inlet valve of the plurality of inlet valves, and the diaphragm is sequentially engaged by each of the inlet valves of the plurality of inlet valves;
a single shutoff check valve controlling fluid flow from the center outlet chamber, the single shutoff check valve comprising a plunger in the center outlet chamber movable between a fully closed position and an open position;
a single bypass valve within the center outlet chamber and in fluid communication with the center outlet chamber and each of the plurality of inlet chambers, the center outlet chamber intersecting each of the plurality of inlet chambers;
a single shutoff switch, the single shutoff check valve being actuated by the single shutoff switch.

* * * * *